United States Patent [19]

Nakajima

[11] Patent Number: 5,189,693
[45] Date of Patent: Feb. 23, 1993

[54] REMOTE CONTROL FACSIMILE APPARATUS WITH REMOTELY SET OPERATION MODE

[75] Inventor: Masato Nakajima, Kanagawa, Japan

[73] Assignee: Ricoh Company, Ltd., Tokyo, Japan

[21] Appl. No.: 672,321

[22] Filed: Mar. 20, 1991

[30] Foreign Application Priority Data

Mar. 22, 1990 [JP] Japan .................................. 2-69737

[51] Int. Cl.⁵ .......................................... H04M 11/00
[52] U.S. Cl. ............................... 379/100; 379/102; 358/400; 358/435; 358/442; 358/468
[58] Field of Search ............... 358/400, 402–404, 358/406, 407, 434, 435, 438, 439, 442, 468; 379/100, 96–98, 102, 74

[56] References Cited

FOREIGN PATENT DOCUMENTS

| | | |
|---|---|---|
| 58-87956 | 5/1983 | Japan . |
| 58-94270 | 6/1983 | Japan . |
| 63-48049 | 2/1988 | Japan . |
| 63-94767 | 4/1988 | Japan . |
| 63-126364 | 5/1988 | Japan . |
| 63-284970 | 11/1988 | Japan . |

OTHER PUBLICATIONS

M. S. Piercy, "Autofax: Store-and Forward Facsimile System", POEEJ, vol. 71, Jan. 1979, pp. 266–269.

Primary Examiner—James L. Dwyer
Assistant Examiner—Wing F. Chan
Attorney, Agent, or Firm—Oblon, Spivak, McClelland, Maier & Neustadt

[57] ABSTRACT

A facsimile apparatus can be remote-controlled so that the facsimile apparatus executes a predetermined operation mode corresponding to number information inputted thereto by an operator via a line only when the facsimile apparatus is set in a predetermined condition corresponding to the predetermined operation mode. The facsimile apparatus judges whether or not the number information is correct and whether or not the facsimile apparatus is set in the predetermined condition. A signal sound is transmitted from the facsimile to an operator in a case where the number information is not correct which is different from a signal sound transmitted in a case where the facsimile apparatus is not set in the predetermined condition. Therefore, the operator can clearly recognize the reason why the facsimile apparatus cannot be remote-controlled.

5 Claims, 4 Drawing Sheets

REMOTE CONTROL FACSIMILE APPARATUS WITH REMOTELY SET OPERATION MODE

BACKGROUND OF THE INVENTION

The present invention relates generally to facsimile apparatuses, and more particularly to a facsimile apparatus which can be remote-controlled.

Use of a facsimile apparatus (abbreviated FAX hereinafter) which can be remote-controlled by telephone has become wide spread. Such a FAX can transfer an image data which has been stored in its memory during its operator's absence or a communication administration report to another designated facsimile apparatus, as disclosed in Japanese Laid-Open Patent Applications No. 58-94270 and No. 63-126364. Executing the remote control, the operator inputs various numbers representing an ID number and an operation mode of the FAX via push buttons. The FAX responds to the operator by means of a couple of predetermined signal sounds, an acknowledgment (abbreviated ACK hereinafter) sound representing YES and a not-acknowledgment (abbreviated NACK hereinafter) sound representing NO. The ACK sound is transmitted to the operator when the inputted ID number is correct or when the FAX can execute the operation mode. The NACK sound is transmitted thereto when the inputted ID number is wrong or when the FAX cannot execute the operation mode. The ACK/NACK sound is transmitted for every input number. The FAX can execute the operation mode only when the FAX is set in the predetermined condition corresponding to the operation mode. Therefore, when the operator receives the NACK sound regarding the operation mode, the operator begins to worry whether or not the FAX has been set in the predetermined condition or if he/she has inputted a wrong number by mistake. In this case, the operator must repeat the same operation to confirm that he/she has inputted the correct number, which is troublesome for the operator. To overcome this problem, it is conceivable that an audio message with the NACK representing what confirmation item has been rejected could be transmitted by FAX, as disclosed in Japanese Laid-Open Patent Application No. 58-87956. However, this would make the FAX relatively expensive.

SUMMARY OF THE INVENTION

Accordingly, it is a general object of the present invention to provide a novel and useful facsimile apparatus in which the above problems are eliminated.

Another object of the present invention is to provide a relatively inexpensive facsimile apparatus which can be easily and simply remote-controlled.

The more specific object of the present invention is to provide a facsimile apparatus which can be remote-controlled so that the facsimile apparatus executes a predetermined operation mode corresponding to number information inputted thereto by an operator via a line only when the facsimile apparatus is set in a predetermined condition corresponding to the predetermined operation mode, which facsimile apparatus comprises first control means for controlling the connecting of the facsimile apparatus to the line, second control means, responsive to the first control means, for controlling the facsimile apparatus when the facsimile apparatus receives the number information so that the facsimile apparatus executes the predetermined operation mode only when the facsimile apparatus is set in the predetermined condition, first judging means, responsive to the first and second control means, for judging whether or not the number information is correct, first response means, responsive to the first judging means, for transmitting a first signal sound to the operator when the first judging means judges the number information is correct, and for transmitting a second signal sound to the operator when the first judging means judges that the number information is not correct, second judging means, responsive to the first and second control means, for judging whether or not the facsimile apparatus is set in the predetermined condition, and second response means, responsive to the second judging means, for transmitting a third signal sound to the operator when the second judging means judges that the facsimile apparatus is set in the predetermined condition, and for transmitting a fourth signal sound to the operator when the second judging means judges that the facsimile apparatus is not set in the predetermined condition.

According to the present invention, since the operator can discriminate between the second and fourth signal sounds, the operator can clearly recognize the reason why the facsimile apparatus cannot be remote-controlled so that the operator does not have to repeat the same operation to confirm whether or not he/she has inputted the correct number information. In addition, it is easier to generate the signal sound than the audio message so that the FAX according to the present invention is kept relatively inexpensive.

Other objects and further features of the present invention will be apparent from the following detailed description when read in conjunction with the accompanying drawings.

DESCRIPTION OF THE PREFERRED EMBODIMENTS

Figure 1:
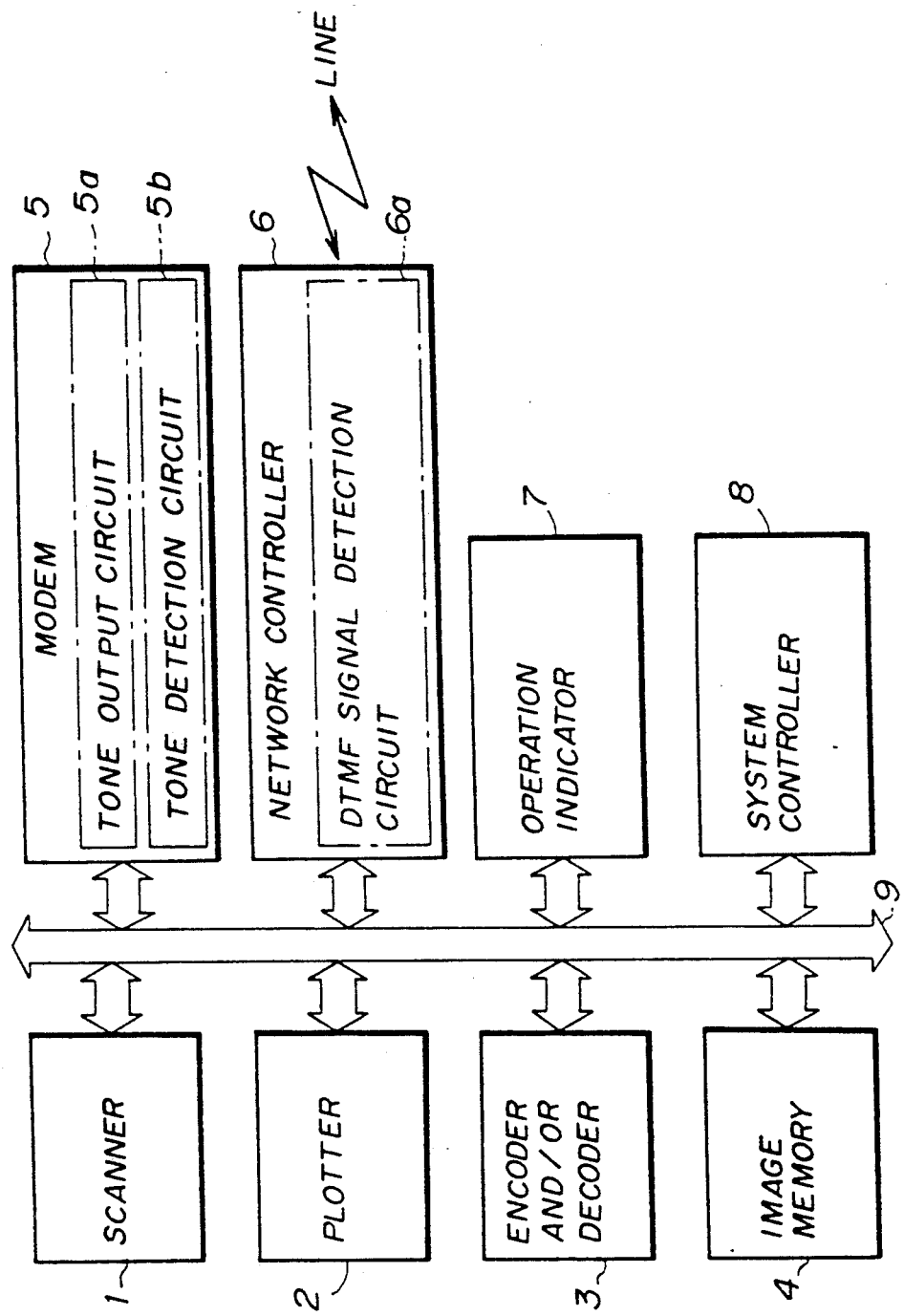
FIG. 1 shows a block diagram of the facsimile apparatus according to the present invention.

The FAX according to the present invention, as shown in FIG. 1, comprises a scanner 1, a plotter 2, an encoder and/or decoder 3, an image memory 4, a MODEM 5, a network controller 6, an operation indicator 7, and a system controller 8. The FAX is a group 3 FAX.

The scanner 1 scans a predetermined image to generate a image data corresponding thereto. The plotter 2 outputs the predetermined image based on the image data on the recording paper. The encoder and/or decoder 3 encodes and compresses the image data and/or decodes the compressed image data to restore the image data. The image memory 4 stores the image data received and/or to be transmitted. The MODEM 5 modulates and/or demodulates the image data. The MODEM 5 comprises a tone output circuit 5a and a tone detection circuit 5b. The tone output circuit 5a outputs various procedure signals, such as a CED signal, a CNG signal, and signal sounds responsive to the remote control of the operator. The tone detection circuit 5b detects the above procedure signal to be transmitted. The network controller 6, operatively interconnected to the telephone line, performs the line controlling when the FAX transmits an outgoing call to a predetermined FAX. The network controller 6 comprises a DTMF signal detection circuit 6a which detects a dual tone multi-frequency (abbreviated DTMF hereinafter) signal transmitted from a telephone. The number information is inputted to the FAX as the DTMF signal. The operation indicator 7, comprising various operation keys and indicators, indicates the operation of the FAX. The system controller 8 controls each part of the FAX. The scanner 1, plotter 2, encoder and/or decoder 3, image memory 4, MODEM 5, network controller 6, operation indicator 7, and system controller 8 are coupled to the system bus so as to be connected with each other. Incidentally, the FAX outputs a communication administration report or received image data stored in the memory 4 to another FAX by means of the remote control.

A description will now be given of an image transference process with reference to FIGS. 2A, 2B and 3. The FAX outputs the received image data to the other FAX in accordance with the image transference process. First, the operator transmits an outgoing call to the FAX from the outside via a push-button telephone. When the line is connected between the FAX and the operator, the operator inputs the ID number of the FAX. One arbitrary numeral has been preselected for the ID number by the operator. Incidentally, the operator inputs "#" after he/she inputs the predetermined number information so that the FAX can recognize that inputting of the number information has been ended.

Figure 2A:
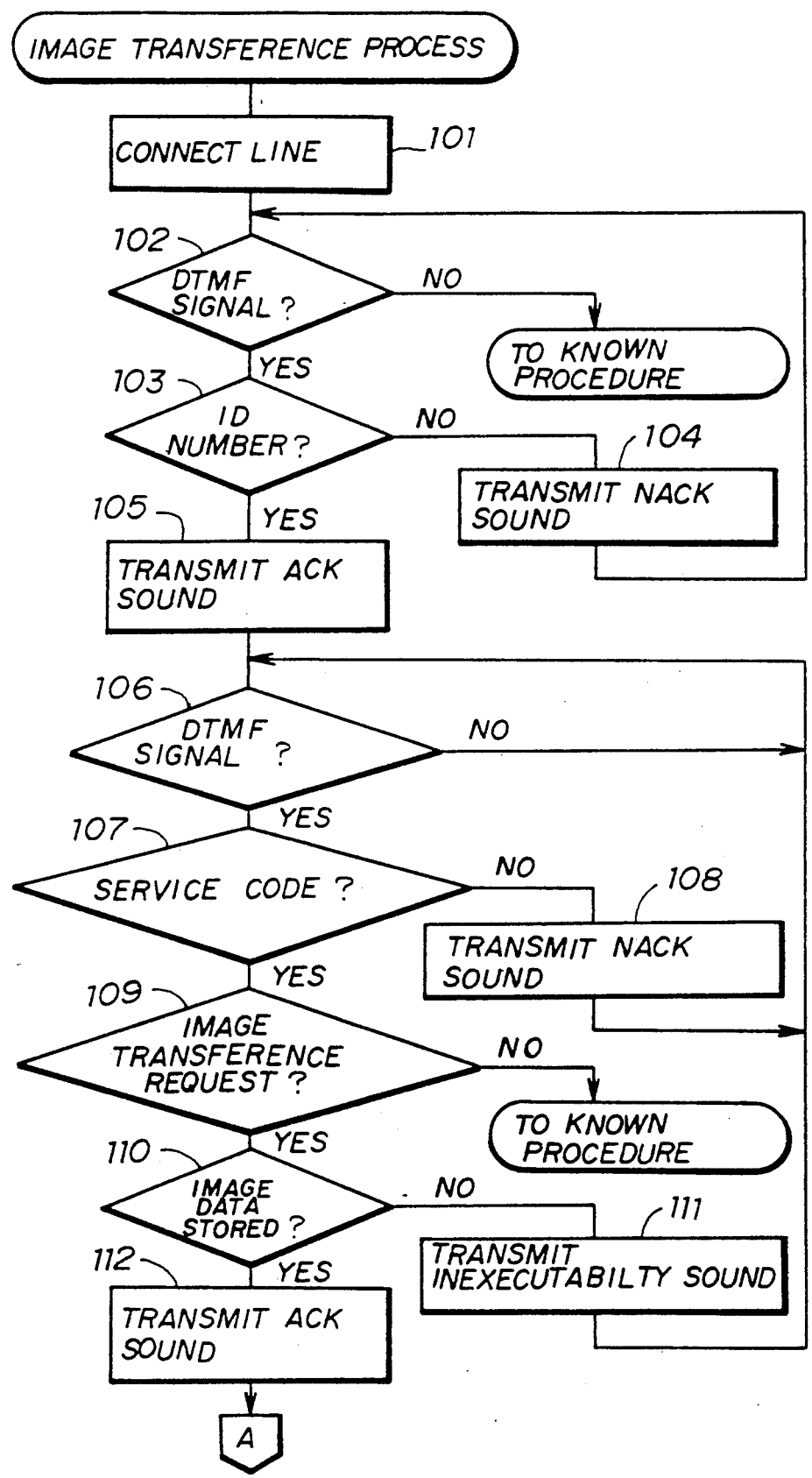
FIG. 2A and 2B show a flowchart of the image transference process of the facsimile apparatus.
Figure 2B:
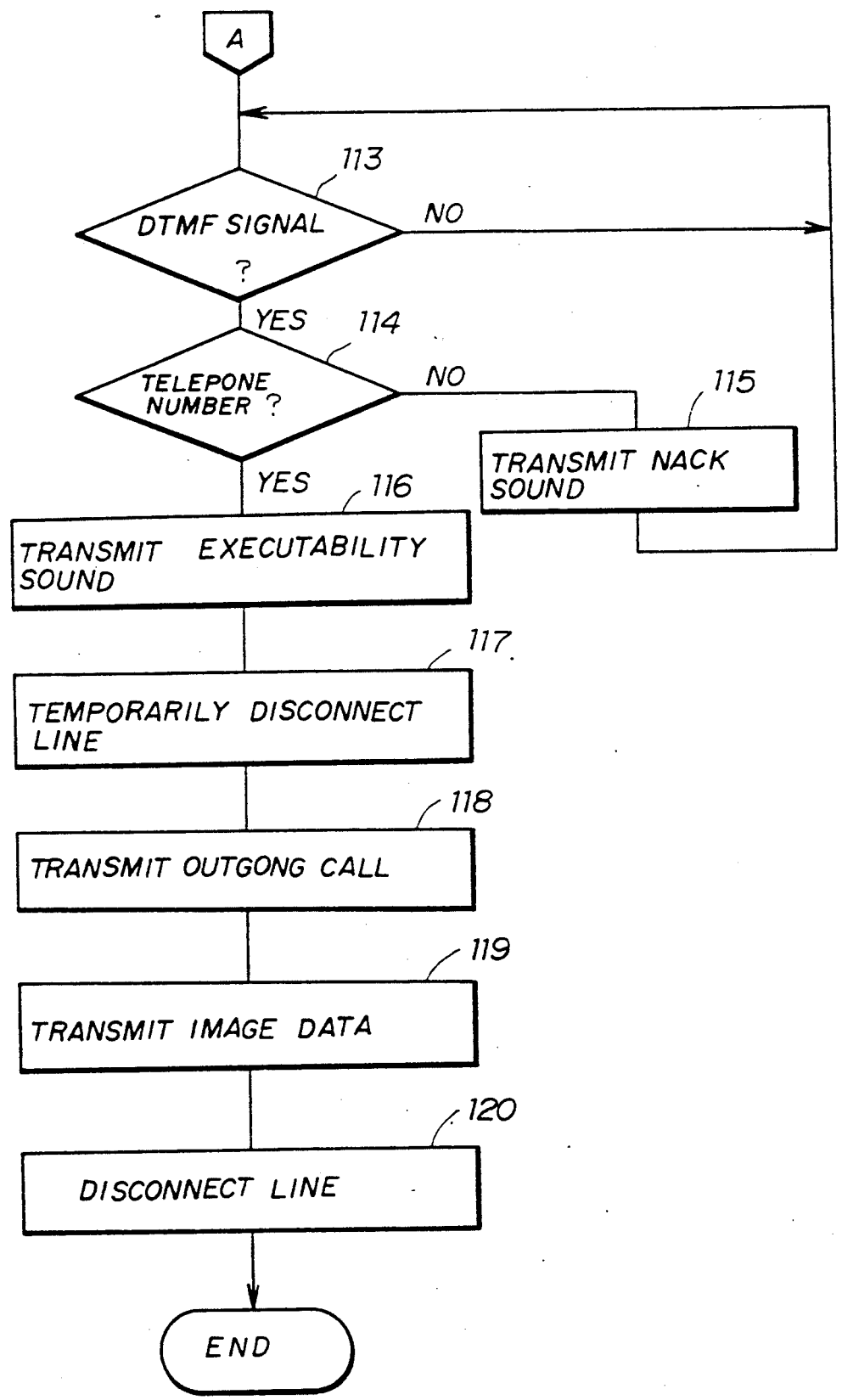
Figure 3:
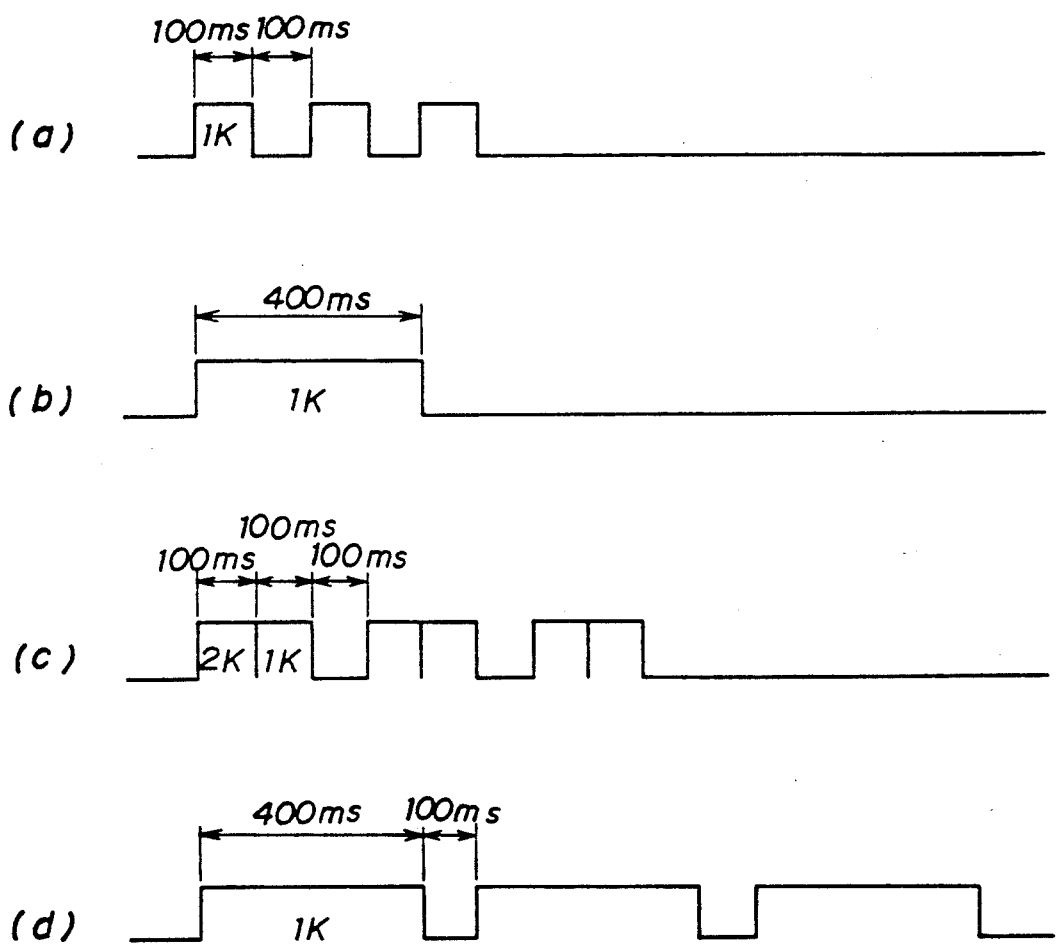
FIG. 3 shows a signal sound time chart.

When the FAX receives the DTMF signal, it executes the image transference process shown in FIGS. 2A and 2B. First, a step 101 connects the line between the FAX and the telephone via the network controller 6. Subsequently, a step 102 judges whether or not the FAX has received the DTMF signal via the DTMF signal detection circuit 6a. If the step 102 judges YES, a step 103 judges whether or not the signal is the ID number by means of the system controller 8. If the step 102 judges NO, the process is transferred to a known process. If the step 103 judges NO, a step 104 transmits the NACK sound to the operator via the tone output circuit 5a. The NACK sound may comprise a signal having a 1 KHz frequency for a 100 ms period and oscillating three times as shown in FIG. 3(a). When the operator receive the NACK sound, he/she recognizes that he/she has inputted a wrong ID number, and then he/she will input the correct ID number. On the other hand, if the step 103 judges YES, a step 105 transmits the ACK signal to the operator. The ACK sound may comprise a signal at a high-level having a 1 KHz frequency for a 400 ms period as shown in FIG. 3(b). Thus, the operator can recognize that he/she has inputted the correct ID number. Then the operator inputs the predetermined number representing the corresponding operation mode. The operation mode includes a service code. Therefore, the operator must first input the service code of the operation mode. When the operator inputs the predetermined number, a step 106 judges whether or not the FAX has received the DTMF signal. The step 106 continues to judge until the FAX receives the DTMF signal. If the step 106 judges YES, a step 107 judges whether or not the DTMF represents the service code. The system controller 8 includes a ROM (not shown) which stores various kinds of service codes, the DTMF being compared with one of the service codes stored in the ROM. If the DTMF signal is not one of the service codes stored in the ROM, the step 107 judges NO so that a step 108 transmits the NACK sound to the operator, and the procedure is transferred to the step 106. However, if the DTMF signal is included in the ROM, the step 107 judges YES so that a step 109 judges whether or not the operation mode is the image transference request via the system controller 8. If the step 109 judges NO, the procedure is transferred to the known procedure. On the other hand, if the step 109 judges YES, a step 110 judges whether or not the received image data to be transmitted is stored in the image memory 4. If the step 110 judges NO, a step 111 transmits an inexecutability sound to the operator via the tone output circuit 5a, and the procedure is transferred to the step 106. The inexecutability sound may comprise a signal having 1 KHz and 2 KHz frequencies for a 100 ms period and oscillating three times as shown in FIG. 3(c). Thus, the operator can recognize that the FAX has not been set in the predetermined condition. The order of the steps 107 and 110 may be reversed. Since the NACK sound is transmitted by the respective steps 108 and 111 in the conventional FAX, the operator thereof cannot recognize whether or not the FAX has been set in the predetermined condition or if he/she has inputted a wrong number by mistake. On the contrary, according to the present invention, since each of the steps 108 and 111 transmits a different sound to the operator, the operator can recognize the above. If the step 110 judges YES, a step 112 transmits the ACK sound to the operator.

After the step 112, the operator must input the telephone number of the communicatee FAX to which the image data is to be transmitted. A step 113 judges whether or not the FAX has received the DTMF signal. The step 113 continues to judge until the operator inputs the telephone number. If the step 113 judges YES, a step 114 judges whether or not the DTMF signal represents the telephone number by means of the system controller 8. The system controller 8 judges, for example, based on the figure obtained from the DTMF signal. If the step 114 judges NO, a step 115 transmits the NACK sound to the operator, and the procedure is transferred to the step 113. However, if the step 114 judges YES, a step 116 transmits an executability sound to the operator. The executability sound may comprise a signal at a high level of 1 KHz for 400 ms period and at a low level for 100 ms, the signal oscillating three times as shown in FIG. 3(d). Thus, the operator can recognize the FAX is set in the predetermined condition. Subsequently, a step 117 temporarily disconnects the line, and a step 108 transmits the outgoing call to the communicatee FAX. When the communicatee FAX responds, a step 119 transmits the image data thereto. After transmitting the image data, a step 120 disconnects the line from the communicatee FAX, and then the procedure is terminated.

The tone output circuit 5a is less expensive than means for transmitting the audio message disclosed in the Japanese Laid-Open Patent Application No. 58-87956. In addition, the tone output circuit 5a may be separated from the MODEM 5. Moreover, a signal other than the DTMF signal may be used for the remote control. In this case, the telephone further comprises a signal generator so that the signal can remote-control the FAX.

Further, the present invention is not limited to these preferred embodiments, and various variations and modifications may be made without departing from the scope of the present invention.

What is claimed is:

1. A remote-controlled facsimile apparatus in which a predetermined operation mode corresponding to number information received from an external calling unit via a telephone line is executed only when said facsimile apparatus is set in a predetermined condition, said facsimile apparatus comprising:

memory means for storing various service codes corresponding to the number information being received from the calling unit via the telephone line;

first control means for controlling connection of said facsimile apparatus to the telephone line, said first control means including a DTMF signal detection circuit for detecting the reception of a DTMF signal transmitted from the calling unit via the telephone line;

second control means, coupled to said first control means and said memory means, for controlling the overall operations of said facsimile apparatus, said second control means executing a predetermined operation mode corresponding to the number information being received from the calling unit via the telephone line only when aid facsimile apparatus is set in the predetermined condition; and a modem unit, coupled to said first and second control means, for modulating a carrier signal and for demodulating a modulated carrier signal, said modem unit including a tone output circuit for outputting various procedure signals used by said first control means, and for outputting various signal sounds to the calling unit via the telephone line in response to the number information received from the calling unit, wherein said tone output circuit outputs an acknowledgment signal sound to the calling unit via the telephone line when an image transference request is specified by a DTMF signal received by said first control means and an image data to be transferred is stored in an image memory provided in said facsimilie apparatus, wherein said tone output circuit outputs a non-acknowledgment signal sound to the calling unit via the telephone line when said acknowledgment signal sound has been output by said tone output circuit and a telephone number of a facsimile unit to which the image data stored in the image memory is to be transferred is not correctly specified by a DTMF signal received by said first control means, wherein said tone output circuit outputs an inexecutability signal sound to the calling unit via the telephone line when the image transference request is specified by the DTMF signal received by said first control means and no image data to be transferred is stored in the image memory, said inexecutability signal sound being different from said non-acknowledgement signal sound and being recognizable to an operator at the calling unit for indicating that the facsimile apparatus has not been set in the predetermined condition, and wherein said tone output circuit outputs an executability signal sound to the calling unit via the telephone line when said telephone number of said facsimile unit to which the image data stored in the image memory is to be transferred is correctly specified by the DTMF signal received by said first control means, said executability signal sound being different from said acknowledgement signal sound and being recognizable to an operator at the calling unit for indicating that said facsimile apparatus has been set in the predetermined condition.

2. A facsimile apparatus according to claim 1, wherein each of said acknowledgment signal sound, said non-acknowledgment signal sound, said executability signal sound and said inexecutability signal sound has a constant frequency.

3. A facsimile apparatus according to claim 1, wherein said facsimile apparatus is a group 3 facsimile apparatus.

4. A facsimile apparatus according to claim 1, wherein the operation mode comprises transmitting a communication administration report to the external facsimile apparatus.

5. A facsimile apparatus according to claim 3, wherein each of said acknowledgement signal sound, said non-acknowledgment signal sound, said executability signal sound and said inexecutability signal sound has a constant period.

* * * * *